US012593146B2

(12) United States Patent
Van Der Tempel et al.

(10) Patent No.: US 12,593,146 B2
(45) Date of Patent: Mar. 31, 2026

(54) PIXEL ARRAY WITH DYNAMIC LATERAL AND TEMPORAL RESOLUTION

(71) Applicant: VoxelSensors SRL, Brussels (BE)

(72) Inventors: Ward Van Der Tempel, Keerbergen (BE); Johannes Willem Peeters, Antwerp (BE); André Bernard Miodezky, Ukkel (BE); Christian Mourad, Genval (BE)

(73) Assignee: VoxelSensors SRL, Brussels (BE)

( * ) Notice: Subject to any disclaimer, the term of this patent is extended or adjusted under 35 U.S.C. 154(b) by 41 days.

(21) Appl. No.: 18/572,749

(22) PCT Filed: Jun. 29, 2022

(86) PCT No.: PCT/IB2022/000323
§ 371 (c)(1),
(2) Date: Dec. 20, 2023

(87) PCT Pub. No.: WO2023/281308
PCT Pub. Date: Jan. 12, 2023

(65) Prior Publication Data
US 2024/0292123 A1 Aug. 29, 2024

(30) Foreign Application Priority Data

Jul. 5, 2021 (BE) .................................. 2021/5521

(51) Int. Cl.
*H04N 25/60* (2023.01)
*G01J 1/44* (2006.01)
*G01S 7/4863* (2020.01)
*G01S 7/487* (2006.01)
*G01S 17/894* (2020.01)
*H04N 23/71* (2023.01)
*H04N 25/46* (2023.01)
(Continued)

(52) U.S. Cl.
CPC ............. *H04N 25/60* (2023.01); *H04N 23/71* (2023.01); *H04N 25/77* (2023.01); *H04N 25/79* (2023.01)

(58) Field of Classification Search
CPC ........ H04N 25/60; H04N 25/77; H04N 25/79; H04N 23/71; H04N 25/46; H04N 25/773; G01S 17/894; G01S 7/4816; G01S 7/4863; G01S 7/4865; G01S 7/487; H10F 30/225; G01J 1/44
See application file for complete search history.

(56) References Cited

U.S. PATENT DOCUMENTS 11,029,397 B2 * 6/2021 Bulteel .................. G01S 17/10
11,222,910 B2 * 1/2022 Etoh ................... H10F 39/8027
(Continued)

FOREIGN PATENT DOCUMENTS

WO 2018181307 A1 10/2018

OTHER PUBLICATIONS

International Preliminary Report on Patentability received for PCT Patent Application No. PCT/IB2022/000323, mailed on Jan. 18, 2024, nine pages.
(Continued)

*Primary Examiner* — Marly S Camargo
(74) *Attorney, Agent, or Firm* — Morrison & Foerster LLP

(57) ABSTRACT

The present invention relates to an improved system and method for imaging, based on single photon detectors (SPDs), whereby false positives are suppressed.

17 Claims, 3 Drawing Sheets

(51) Int. Cl.

| | |
|---|---|
| *H04N 25/77* | (2023.01) |
| *H04N 25/773* | (2023.01) |
| *H04N 25/79* | (2023.01) |
| *H10F 30/225* | (2025.01) |

(56) References Cited

U.S. PATENT DOCUMENTS

| | | | | |
|---|---|---|---|---|
| 11,532,143 | B2 * | 12/2022 | Seo | G06F 18/243 |
| 12,025,741 | B2 * | 7/2024 | Lu | G01S 7/4816 |
| 2019/0326347 | A1 | 10/2019 | Bulteel | |
| 2020/0018831 | A1 | 1/2020 | Azuma et al. | |
| 2020/0266222 | A1 | 8/2020 | Etoh | |
| 2020/0410272 | A1 | 12/2020 | Seo | |

OTHER PUBLICATIONS

Japanese Office action dated Feb. 3, 2026, for JP Application No. 2023-579860, with Machine English translation, 15 pages.

\* cited by examiner

PIXEL ARRAY WITH DYNAMIC LATERAL AND TEMPORAL RESOLUTION

CROSS REFERENCE TO RELATED APPLICATIONS

This application is a national stage application under 35 U.S.C. § 371 of International Application No. PCT/IB2022/000323, filed internationally on Jun. 29, 2022.

TECHNICAL DOMAIN

The invention relates to a sensor system for imaging under a very high spatial and temporal resolution, whereby an array of single photon detectors (SPDs) is provided, the output signal of which is subjected to evaluation logics for filtering out false positives due to ambient light, thermal noise and other influences.

PRIOR ART

In prior art, high-speed imaging systems have to contend with a number of requirements and problems. A first one is the accuracy with which incident photons are detected. Increasingly higher demands are made in terms of spatial resolution, resulting in the sensor arrays having increasingly more separate detectors (pixels). This means increased computing power is needed to read all said detectors and to process the output signals into an image. Because the separate pixels always (have to) become smaller, the photosensitivity must also increase, as they have a limited spatial window to capture photons. For this reason very sensitive detectors, such as SPDs or SPADs (single photon-avalanche-detectors), are often considered.

However, said detectors have the inherent disadvantage that the increased photosensitivity also causes unwanted excitations, both due to ambient light and due to thermal noise. In itself such excitations on detector level are difficult to distinguish from 'genuine' detections resulting from the incidence of reflected light that was deliberately emitted by the system to scan a scene.

Added to this is the requirement that imaging systems are used in a wide range of conditions, from practically complete darkness, to very bright situations, and also relating to the objects/environment to be captured, varying in terms of reflectiveness and in terms of distance to the imaging system. For this reason it is therefore very difficult to find a single solution that manages to filter out false positives, and can dynamically anticipate the variable circumstances in which the imaging is performed.

The purpose of the present invention is to find a solution for at least a number of the aforementioned problems.

SUMMARY OF THE INVENTION

The invention relates to an improved high-speed sensor imaging system according to claim 1.

In further aspects the invention relates to the embodiments according to the other claims 2 to 15.

DETAILED DESCRIPTION

Figure 1:
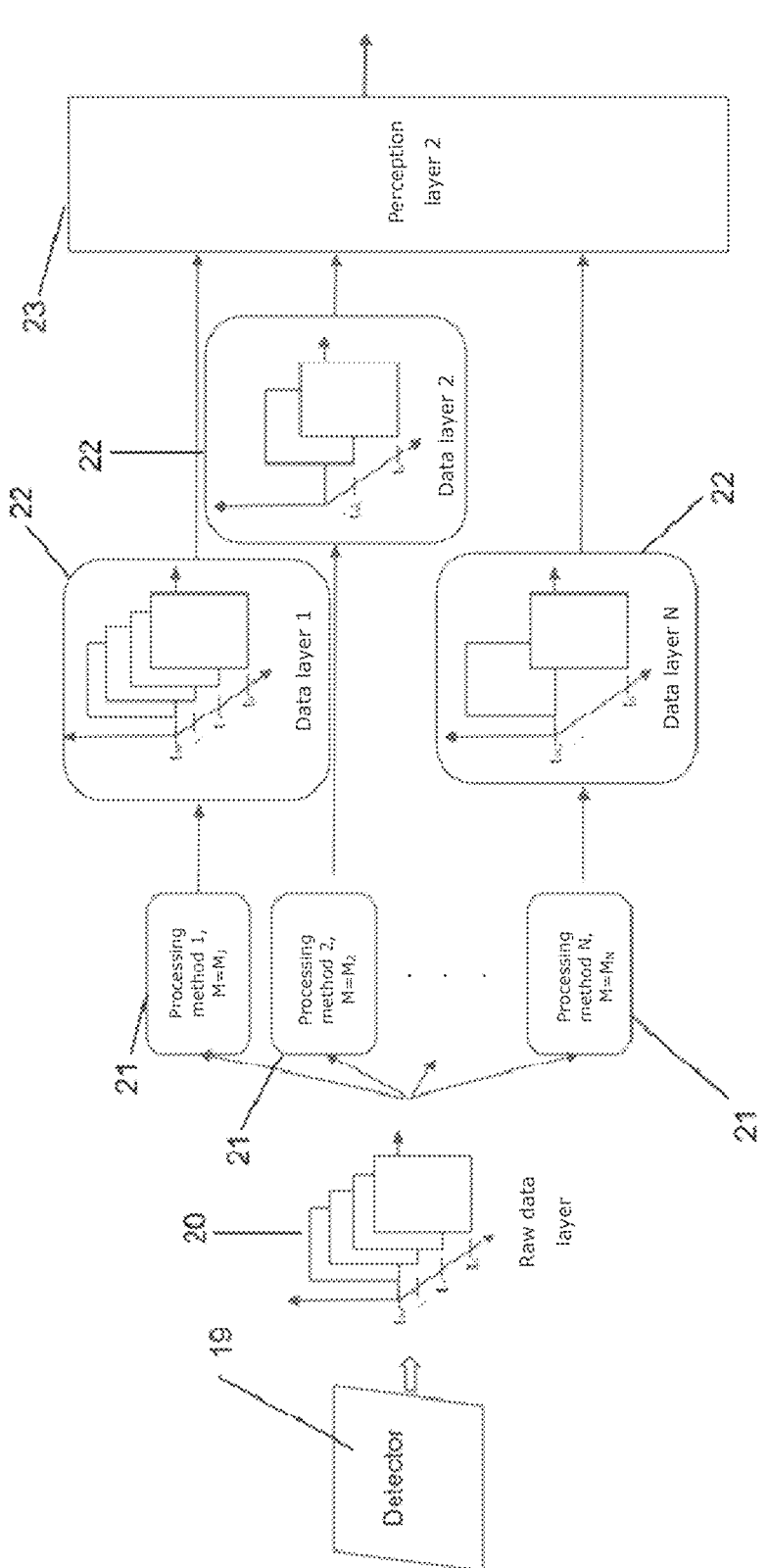
FIG. 1 shows a process flow of a parallel processing of the detector data under different sets of spatiotemporal conditions, according to an embodiment of the invention.

Unless otherwise defined, all terms used in the description of the invention, including technical and scientific terms, have the meaning as generally understood by the person skilled in the technical field of the invention. For a better evaluation of the description of the invention, the following terms are explicitly explained.

"A", "an" and "the" refer to both the singular and the plural in this document unless the context clearly suggests otherwise. For example, "a segment" means one or more than a segment.

When "approximately" or "around" are used in this document for a measurable quantity, a parameter, a duration or moment, and the like, variations of +/−20% or less, preferably +/−10% or less, more preferably +/−5% or less, still more preferably +/−1% or less, and even more preferably +/−0.1% or less than, and of, the quoted value are meant, to the extent that such variations are applicable in the described invention. However, it should be understood that the value of the quantity for which the term "approximately" or "around" is used is itself specifically disclosed.

The terms "comprise", "comprising", "consist of", "consisting of", "provided with", "contain", "containing", "include", "including", "hold", "holding" are synonyms and are inclusive or open terms indicating the presence of what follows, without excluding or precluding the presence of other components, characteristics, elements, members, steps, known from or described in the state of the art.

Quoting numerical intervals by the end points comprises all integers, fractions, and/or real numbers between the end points, including these end points.

In a first aspect the invention relates to a high-speed sensor imaging system, whereby the system comprises one or more light sources, and an array with a plurality of single-photon detectors (or SPDs), said detectors being spatially distributed over the array in a substantial matrix form, preferably at regular intervals from each other, whereby the SPDs are suitable for detecting single photons, and register the detection of the single photon with a detection signal. Preferably, the SPDs are SPADs (single photon-avalanche-detectors).

The system further comprises an evaluation circuit, whereby the detectors are connected to the evaluation circuit, the evaluation circuit being adapted for confirming the detection signals or output signals of the detectors based on spatiotemporal conditions. The detectors are connected such that their output signals (related to detection or non-detection of an incident photon on the detector) go to the evaluation circuit.

The spatiotemporal conditions for confirmation of a detection signal of a detector to be confirmed (i.e. confirmation that it does not relate to a false positive signal, and is effectively related to an own scanning beam), comprise the following conditions:

observing a programmable minimum number of detection signals in detectors located in a virtual macropixel associated to the detector to be confirmed within a time segment associated to the time of observing the detection signal of the detector to be confirmed, said macropixel comprising an, optionally programmable, number of detectors in the proximity of the detector to be confirmed, preferably comprising at least the immediately adjoining detectors, or alternatively comprising the immediately adjoining detector in 1 direction along every axis, for example left and below, or right and top, or another combination (e.g. 2 or 3 of the 4 immediately adjoining detectors).

The term "macropixel" hereby refers to a virtual pixel comprising several pixels or detectors, which typically form a contiguous cluster. Said macropixel may be associated to a certain set of spatiotemporal conditions, and vary depending on the circumstances in terms of size, form and other parameters. Macropixels can partially overlap with each other, and have pixels or detectors in common. Preferably, a macropixel has a square or rectangular form, but can also be approximately circular or oval, triangular, cross- or star-shaped, or have other forms. A macropixel comprises at least 2 detectors (e.g. in 2×1 or 1×2 matrix form), and more preferably at least 4 detectors (e.g. 2×2).

The spatial component of the conditions relates to the requirement that a minimum number of detectors in the macropixel generates a detection signal (i.e. observes a photon) within a certain time segment from each other. Said time segment may be bound to the first detection in the macropixel (e.g. up to 10 ns after the first detection), or may be a fixed successive period (e.g. every 10 ns). The length of the time segment and/or the minimum number of detectors that generates a detection signal can be adapted by the user and/or automatically by the system. Preferably, however, a user can adapt both if desired.

The detectors form an array together, and consist of semiconductor devices that generate an output signal in case of an incident photon. Typically, said detectors comprise a p-n junction which is under a reverse bias voltage above the breakdown voltage, such that a photon incidence triggers a breakdown and a multiplied output signal is generated. However, a big problem with said arrays was always that the evaluation circuits (meters and the like) take up important surface area which is no longer available for photon-sensitive zones of the detector itself.

In a preferred embodiment the system relates to a stacked sensor system, and the detectors are provided in a first layer, and the evaluation circuit(s) in a second layer, lying under the first layer. Additional components, such as quenching circuits, and the like, may be provided in the first, second or in a third, fourth, etc. layer, but preferably in the first or second layer. The detectors, or at least the light-sensitive surface area, are located in the first layer, and above the second layer, to prevent them from shielding part of the surface area. By breaking down the system in layers with a different functionality, it is ensured that a maximum surface area can be used as effective photon-sensitive surface area, while the processing circuits or evaluation circuits are provided in an underlying layer. Said different layers, typically made from separate semiconductor wafers (or even separate chips) that are connected to an IC (integrated circuit), make optimal use of the available surface area for photon collection, and allow simple processing of signals from the detectors.

In a possible embodiment, the system comprises a separate evaluation circuit for every detector. Said evaluation circuit can then be provided with the output signals of every detector of the array or a part thereof. This part can be predefined as, for example, all detectors in a certain zone around the detector associated to the evaluation circuit, such as for example every directly adjacent detector, or every directly, and in secondary order, adjacent detector (secondary order adjacent are also the detectors which are directly adjacent to detectors which are adjacent to the detector associated to the evaluation circuit). Variations are possible, such as the inclusion of diagonally adjacent detectors (resulting in a square for a matrix array).

In yet other versions, an evaluation circuit is provided associated to prefixed clusters of detectors, whereby the evaluation circuit can subsequently process the output signals of the detectors depending on the imposed conditions. By letting the clusters of the evaluation circuits overlap, the risk that there is no 'good' evaluation circuit for processing an incidence on a certain detector is rejected.

In a possible embodiment, only one evaluation circuit is provided which processes the output signals of the detectors in parallel. Preferably, in this case the evaluation circuit has as many outputs (validated detector outputs) as inputs (detectors).

In a preferred embodiment, the evaluation circuit is able to modify the spatiotemporal conditions based on the circumstances of the scene of which an image is formed. Among others, this is based on objectively observable parameters, including intensity of the detected light and based on the ambient light (intensity thereof). In this way it can be determined whether the signal that has to be detected (detected light) is strong or weak, and thus stricter or less strict requirements may/must be imposed, or that there is a lot or a little ambient light, and the requirements may/must be stricter or less strict accordingly.

With a strength of the ambient light slightly above a certain threshold value, there will be more false positives, which are local, however. For this reason, in a further preferred embodiment, a minimum number of detection signals is then opted for in the macropixel of N, with N being at least 2 (e.g. 2, 3, 4 or higher). Below said threshold value, ambient light is less of a problem, and it can be opted to set the minimum number of detection signals to M, with M being at least 1. Note that further options can be set, e.g. a second threshold value ensuring a minimum number of detection signals is required from Q, with Q being at least 3, etc.

In case of a detected light strength above a threshold value, one may assume a strongly reflected (active) signal, and thus limit the observation time window, to thus exclude ambient light and thermal noise again. In that case the duration of the time segment is set at T1 at most. Below said threshold value, a duration of at least T2 is opted for with T2 being greater than T1, whereby T1 is at least 1 ns, and preferably at least 5 ns. Preferably, T2 is at least 10 ns, more preferably at least 20 or even 50 ns. By suitably setting the conditions, it is possible to ensure the evaluation circuit applies a strong filtering to the signals from the separate detectors. In case of a lot of ambient light and thermal noise, the bar is raised, and it may be required that incident photons hit several detectors in a macropixel of e.g. 2 by 2 detectors (or 3 by 3, 2 by 3, 3 by 2, 1 by 2, 2 by 1, 1 by 3, 3 by 1, or other formats), e.g. at least X % of the detectors and/or at least Y detectors in the macropixel which register a detection in the time segment. Thus, one or more stricter conditions can be set here in case of 'very' strong signals ($X_2$% of the detectors and/or $Y_2$ detectors in the macropixel, $X_3$ and/or $Y_3$, etc.). In this way the more sporadic, and spatially more spread out photons from ambient light and thermal noise, are automatically ignored, as chances are very slim that two (or more) detectors will detect such photon from a macropixel in one and the same time segment.

Reversely, in case very little ambient light and thermal noise are detected, the threshold value can be set very low, i.e. confirming for every detection that this is a 'real' photon impact.

In case of a strong active signal (i.e. many incident photons as a result of exposure of the object or scene to be captured), the bar is raised, and it may be required that the duration of the time segment is set at a low threshold value, e.g. maximum 10.0 ns, 5.0 ns, 2.5 ns or even maximum 1.0 ns. In this way it is also ensured that thermal noise and ambient light will typically be filtered, again because chances are very slim that the required M or N detectors in the macropixel will observe a detection within the short duration, while the strong active signal practically guarantees that several photons will be incident within the (effectively exposed) macropixel over a short duration. Again, several gradations from stricter and weaker conditions can be imposed depending on the strength of the active signal. In case of weak signals, the time window is typically expanded to at least 10 ns, but preferably at least 20 ns or even 50 ns.

The combination of both aforementioned parameters ensures that the influence of ambient light and thermal noise can be eliminated practically 100%, which strongly reduces the computing power required to filter out the false positives.

Note that in certain embodiments it is possible to let the ambient light determine the duration of the time segments (above a threshold value the duration is set lower, below a threshold value, the duration is set higher). Hereby, the strength of the active signal (detected light) may or may not be considered as a parameter.

Reversely, in certain embodiments the detected light (active signal) may also influence the required minimum number of detection signals in the macropixel (above a threshold value the number is set higher, below a threshold value the number is set lower). Hereby, the strength of the ambient light may or may not be considered as a parameter.

In a preferred embodiment the light sources emit a light beam or bundle with a known (bundle) diameter and/or known cross-section, whereby preferably the cross-section is not circular or oval. The evaluation circuit is configured to further adapt the spatiotemporal conditions based on the bundle diameter and/or cross-section, preferably whereby the form and/or the number of detectors in a macropixel is dependent on the bundle diameter and/or cross-section, and/or preferably whereby the detectors that generate a detection signal in the time segment, comprise a form which approximates the known cross-section. However, alternatively or additionally, extra conditions can be imposed, such as that the detectors which register a detection signal are spatially situated relative to each other in a form that approximates the cross-section of the emitted light bundles. By working with a specific form of the light bundle, such as a cross, the reflected bundle will retain a similar form (or at least, a substantial part of the photons incident on the array as a result of the exposure by the light sources, will roughly approximate this form), which allows a more targeted search. In this way the form of the macropixels can be adapted to the known cross-section, or a confirmation pattern can be imposed, as previously discussed.

Approximating the form of the known cross-section can be interpreted broadly, and comprises the complete enclosing thereof among others (like a 3×3 array with detection signals also comprises a cross form, or a line). The system can also be configured to allow a certain level of deviations, such as the lack of 1 or more (or X %) of the required 'pixels' (detectors) to represent the known cross-section.

In this way the bundle diameter can also be used to adjust the size of the macropixels. Wide bundles (big diameter) will result in a spatially more diffused recurrent bundle of photons, such that a bigger macropixel (more detectors) may offer advantages. A certain threshold value (or several values) for the bundle diameter can thus also be applied here, which then determines the number of detectors within a macropixel and/or the number of detectors that registers a detection signal in the macropixel within the time segment, and/or the duration of the time segment.

In a preferred embodiment, the evaluation circuit clusters observed detection signals per time segment, whereby the time segments are consecutive and have an equal duration, and whereby the time segment associated to the time of the observation of the detection signal of the detector to be confirmed, is the time segment in which the detection signal of the detector to be confirmed is observed. In this embodiment, the evaluation circuit reads the outputs of the detectors during fixed time segments (directly or already clustered per macropixel). The output signal is thereby, for example, also 'reset' after every measurement from the evaluation circuit (for example via an active quenching circuit (e.g. AQAR or AQPR). Alternatively, resetting can, for example, also be done immediately, while the evaluation circuit registers the detection signal with or without a time stamp.

In an alternative embodiment the time segment only starts to run from a first detection signal of a detector from the macropixel. If the desired minimum number of detectors in the macropixel generates a detection signal within the prefixed duration of the time segment, the detection is confirmed.

For this, the evaluation circuit can, for example, detect the flanks of the detection signals (rising flank), for example with a flip-flop, and convert this to a digital signal (1 or 0), such that it can be simply processed with logical circuits in the further processing.

In a preferred embodiment, based on ambient light and based on the strength of detected light, the virtual macropixel can be modified, whereby in case ambient light is detected below a second prefixed threshold value, a first virtual macropixel is used around the detector to be confirmed, and in case ambient light is detected above the second prefixed threshold value, a second virtual macropixel is used around the detector to be confirmed, whereby the second virtual macropixel comprises fewer detectors than the first virtual macropixel.

Additionally, third, fourth, etc. macropixels with deviating form (configuration of the detectors) and/or size (number of detectors) can still be defined which are applied under specific conditions of ambient light, strength of detected light (active signal) and/or other (manual) settings, for example in the field of desired resolution.

In a preferred embodiment the detectors are provided with a quenching circuit which normalises the detection signal of the detectors. The quenching circuit can be active or passive. Preferably, it relates to an active quenching circuit, controlled by the evaluation circuit such that it 'resets' the detectors at suitable times. Preferably, the quenching circuit is an AQAR (active quenching active reset), although an AQPR (active quenching passive reset) also belongs to the options. By providing a quenching circuit, it is possible to very accurately check the duration of the time segments, and also to reset the detectors sufficiently quickly to detect new photons.

In a possible embodiment, the quenching circuit can also be controlled to immediately reset the detector once the detection signal is registered. In this way, detection of an incident photon by one and the same detector can possibly be detected in the same time segment if the time segment is sufficiently long (and the quenching circuit works sufficiently quickly and thus has a low dead time).

In a preferred embodiment, the evaluation circuit is adapted for confirming the detection signals of the detectors based on multiple sets of spatiotemporal conditions, whereby the evaluation circuit subjects the detection signals to each of the multiple sets of spatiotemperal conditions in parallel.

Each of the multiple sets of spatiotemporal conditions for confirmation of a detection signal of a detector to be confirmed comprises the following conditions:

observing a programmable minimum number of detection signals in detectors located within a virtual macropixel associated to the detector to be confirmed in a time segment associated to the time of the observation of the detection signal of the detector to be confirmed, said macropixel comprising an, optionally programmable, number of detectors in the proximity of the detector to be confirmed, preferably comprising at least the immediately adjoining detectors.

Each of the multiple sets of spatiotemporal conditions hereby mutually comprises a different minimum number of detection signals and/or a different duration of the time segment for confirmation.

By working with a number of prefixed sets of conditions, the system can impose said conditions on the 'raw' detector data (output signals of the detectors) in parallel. In this way, in a single scan, the scene can be reconstructed in different ways, instead of doing several separate sweeps if the results under the previous set of conditions are not satisfactory (resolution too low, too much noise, etc.). Moreover, it is even possible to combine the images generated by the different sets, such that zones of the image where one set falls short in terms of settings, can be completed/corrected by using sections of the image from one or more other images.

In a further preferred embodiment, the multiple sets of spatiotemporal conditions comprise a first set whereby the duration of the time segment of the first set T1 amounts to at least 10 ns, preferably at least 50 ns, and the minimum number of detection signals of the first set M1 is equal to 1. The multiple sets of spatiotemporal conditions comprise a second set whereby the duration of the time segment of the second set T2 amounts to less than 10 ns and the minimum number of detection signals of the second set M2 amounts to at least 2. The multiple sets of spatiotemporal conditions comprise a third set whereby the duration of the time segment of the third set T3 amounts to at least 10 ns, preferably at least 50 ns, and the minimum number of detection signals of the third set M3 is equal to 1.

The above three sets of conditions allow most situations to be covered, a first set in case of a weak active signal and limited ambient light, a second set for medium ambient light, and a third set for strong ambient light and/or a weak active signal, as in the ambient light the greatest variation can be present over which there is little control. Further sets can still be provided for covering further variations in the strength of the detected light (active signal) and/or ambient light.

In a preferred embodiment the evaluation circuit is configured for defining the macropixels and whereby the detection signals of the detectors are binned together in one macropixel, and whereby the spatiotemporal conditions are imposed on the binned detection signals. Said macropixels can be preprogrammed (according to certain rules, dependent or not on form and size of the array of detectors). In this way the macropixels can be positioned adjoiningly, without overlap, or there may be a limited overlap. In a specific embodiment—under every set of spatial conditions—a macropixel is coupled to every detector, such that detectors can belong to 2, 3, 4 or even more macropixels. By defining the macropixels through the evaluation circuit, all detection signals can simply be aggregated/bound there per macropixel. If other conditions, with a differently defined macropixel (form, size), are imposed, the correct detection signals are automatically bound for the new macropixel as well.

In a preferred embodiment, the evaluation circuit is configured for redefining the macropixels, whereby the number of detectors per macropixels can be adapted. Preferably, the evaluation circuit is configured for automatically redefining the macropixels based on the detection signals of the detectors, preferably based on a total number of detection signals over a unit of time. As indicated, making the macropixels adaptable is a strong tool to respond to the circumstances, such as active signal and ambient light, and/or the form of the light bundle/beam that is emitted. Imposing limitations to the size or form of the macropixel can help to filter out false positives.

In a preferred embodiment, the system is pre-programmed with macropixels which can adopt at least two of the following configurations: 2×1, 1×2, 2×2, 3×1, 1×3, 3×2, 2×3, 3×3 and/or cross- or star-shaped (1 central detector with every directly adjacent detector). Preferably, at least 3, 4, 5 or more of the configurations can be adopted. The most important configurations hereby are 2×1, 1×2 and 2×2.

Additional possible configurations are, for example, diagonals (two or more diagonally connected detectors), diagonal cross or star, etc.

In a preferred embodiment, the evaluation circuit is programmed such that the time segments succeed each other periodically. Alternatively, time segments are triggered per macropixel by receipt of a detection signal in the evaluation circuit of a detector from the macropixel.

In a preferred embodiment, a further spatiotemporal condition is imposed on a confirmed detection signal of a detector in a first macropixel, whereby the further spatiotemporal condition comprises that a confirmed detection signal associated to a detector in a macropixel adjacent to the first macropixel is detected in a prefixed time window of the confirmed detection signal of the detector in the first macropixel. Adjacent macropixels are hereby defined as macropixels which each comprise at least one non-communal detector; and which have at least one detector in common and/or each at least comprise a detector which in the matrix form of the array is adjacent to a detector of the other macropixel of the first and the adjacent macropixel. This comes down to macropixels whereby the detectors of one of the macropixels are not only detectors of the other macropixel too, but which thus do have one or more adjacent detectors and/or at least one communal detector.

The aforementioned embodiment uses the (relative) predictability of the movement of (the light beams of) a scanning light source. As typically said source makes a continuous movement (for example, one unbroken curve), it can also be expected that the incident light on the detector array will follow a substantially unbroken pattern over time. However, some more play may occur (and be permitted), more abrupt jumps may take place, and in some cases even discontinuities. Nevertheless, typically if there's a confirmed detection in a macropixel, neighbouring macropixels in previous time windows will also have confirmed a detection, according to the movement of the incident light beam coming from the scene/the object on the array. By imposing this as further conditions, further false positives that slipped through the net can also be removed.

This principle can also be used to reduce the region of interest, the signals of which are processed in the evaluation circuit. In this way, once a detection is confirmed in a certain macropixel, the evaluation circuit, can only consider and process signals from nearby macropixels in a consecutive time window, as a next detection can be expected to fall in a certain radius of the previous detection. Said radius can be dynamically determined (based on previously confirmed detections and the 'jumps' in macropixels per time window thereof) or can be absolutely determined from the system according to a prefixed value (distance from X detectors/macropixels relative to previous confirmed detection). By limiting the region of interest, the system can strongly reduce the computational load, and no longer take into consideration signals from the detectors beyond. Moreover, it also follows that, in the situations where the incident light were to fall outside the ROI, this can be simply identified by the system, as no incidence is detected, and the system can let the light source repeat a very limited part of the sequence, with expansion of the ROI (e.g. gradually or immediately in full).

In a preferred embodiment, a first of the multiple sets of spatiotemporal conditions uses macropixels with a first number of detectors, while a second of the multiple sets of spatiotemporal conditions uses macropixels with a second number of detectors, the first and the second number of detectors being different from each other, and preferably whereby a third of the multiple sets of spatiotemporal conditions uses macropixels with a third number of detectors, the third number of detectors being different from the first and the second number of detectors. The advantages of this have been discussed earlier, and allow the resolution to be increased/decreased in different circumstances, and also to adapt the confirmation conditions to the situation (ambient light, strength of the active signal, etc.).

In a preferred embodiment, the detectors within a macropixel with K×L detectors are positioned in a square or rectangular configuration. The detectors in the macropixel are clustered by the evaluation circuit in R complementary sub-macropixels of $P_i \times Q_i$ detectors, with i=1 .... R and with $P_i$ less than or equal to K/2 and $Q_i$ less than or equal to L/2. The detection signals of the detectors are hereby aggregated into sub-macropixel detection signals by the evaluation circuit per sub-macropixel, and the evaluation circuit is configured for imposing the spatiotemporal conditions on the sub-macropixels and the sub-macropixel detection signals of the macropixel instead of on the detectors and the detection signals of the macropixel.

In this way the resolution can be dynamically adapted to the circumstances, and with a confirmed detection in a macropixel, it is possible to opt to simultaneously form an image with higher resolution via the sub-macropixels.

In a preferred embodiment, the system is provided with one or more electronic circuits between the detectors and the evaluation circuit, if relevant integrated in the detectors, which convert the output signal of the detectors into a discrete signal (detection signal or not) and in this way deliver it to the evaluation circuit. The electronic circuits can perform additional actions, such as adding a time stamp to the discrete signal, or information regarding the position of the detector associated to the signal. Preferably, the system is adapted to mutually synchronise the electronic circuits of the array. As indicated, a quenching circuit can be provided for the detectors.

In a further embodiment, the evaluation circuit can also register for each macropixel how many detection signals were generated in the time segment, which can yield further physical information regarding the scene/object that is captured.

In what follows, the invention is described by means of non-limitative examples which illustrate the invention, and which are not intended or must not be interpreted to limit the scope of the invention.

EXAMPLES

Example 1

FIG. 1 describes a process flow for a parallel processing of the signals (20) from the detectors (19) in several parallel layers. Initially the raw data (20) as such enters the evaluation circuit, and can be processed there under the separate sets of conditions (21), to thus generate different results—data layers 1 to N—(22), which can finally be processed further into an image for the user (23). This further processing can be the selection of a certain data layer, or the combination of several thereof for example.

Example 2

Figure 2A:
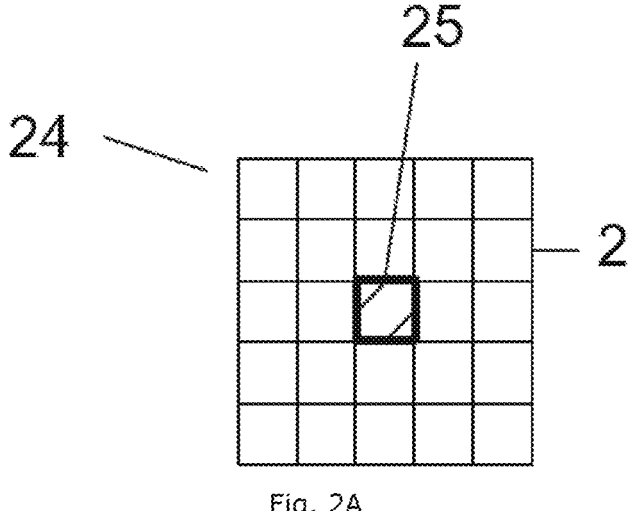
FIGS. 2A-C show a system according to an embodiment of the invention in a number of separate situations with associated sets of spatiotemporal conditions.
Figure 2B:
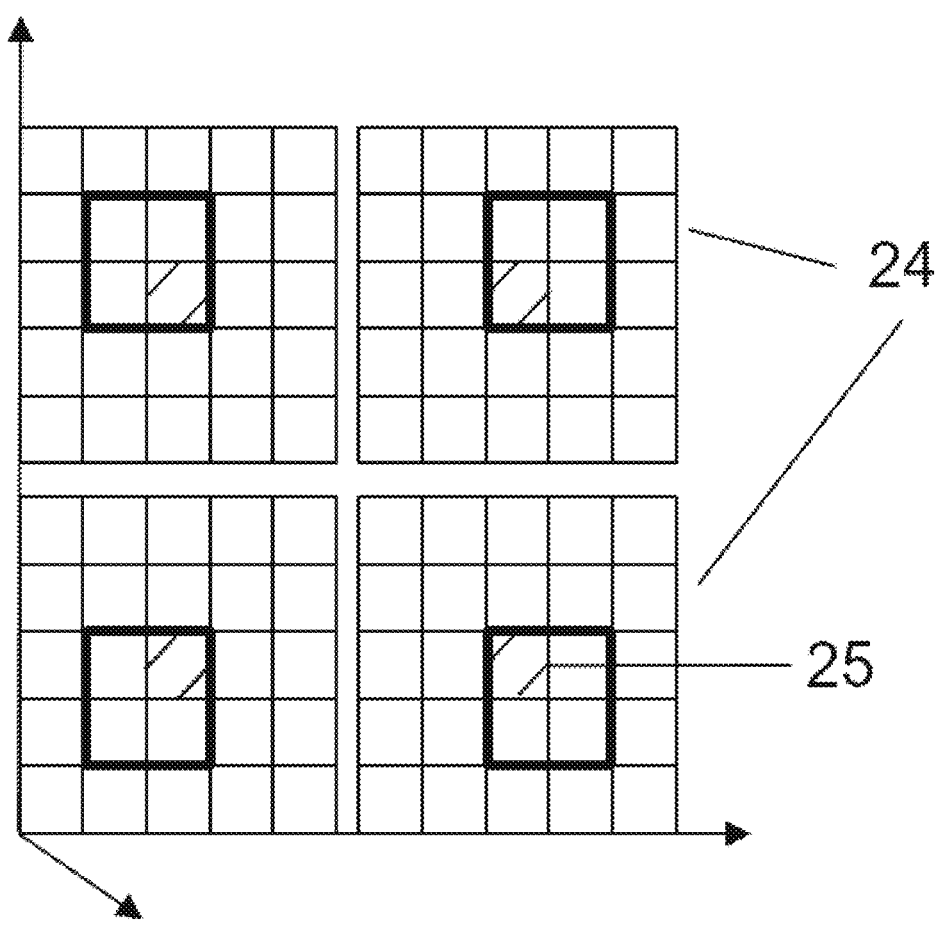
Figure 2C:
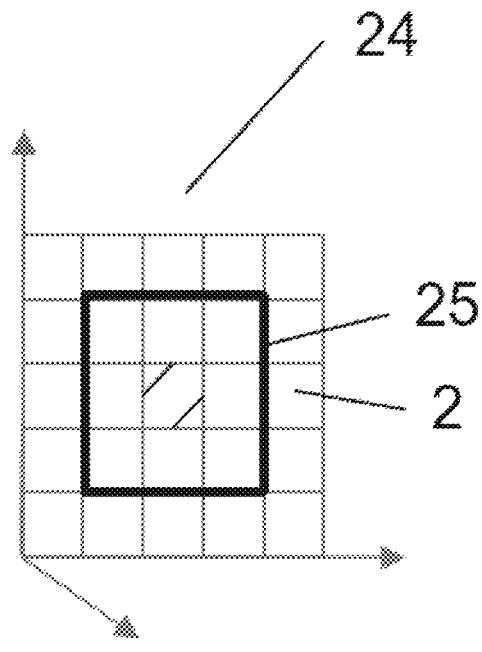

FIGS. 2A-C describe possible conditions belonging to different sets of spatiotemporal conditions. The array (24) with detectors (2) is presented as 5 rows and 5 columns, with every cell representing a detector. The subarray with thickened edge represents the virtual macropixel(s) (25), the shaded central cell a detector which generates a detection signal.

FIG. 2A describes a full-pass situation, where there is little ambient light and the spatiotemporal conditions are disabled, as every detection signal is accepted as a confirmed detection (M1=1).

FIG. 2B shows a situation where the spatiotemporal conditions imply that (M2=) two detection signals are registered within a time segment T2 within macropixels of 2 by 2 detectors. The figure shows 4 virtual macropixels associated to an exposed detector (dark square), and the system hereby looks for macropixels where another detector also registers a detection signal within the time segment T2.

FIG. 2C finally shows a situation where the virtual macropixels have another size, i.e. 3 by 3 detectors. Again the system looks for cases where within one and the same macropixel M3 (e.g. equal to 2) detection signals are registered within a time segment T3. This is particularly applicable to situations with a weaker active signal than in the situation of FIG. 2B.

Example 3

Figure 3:
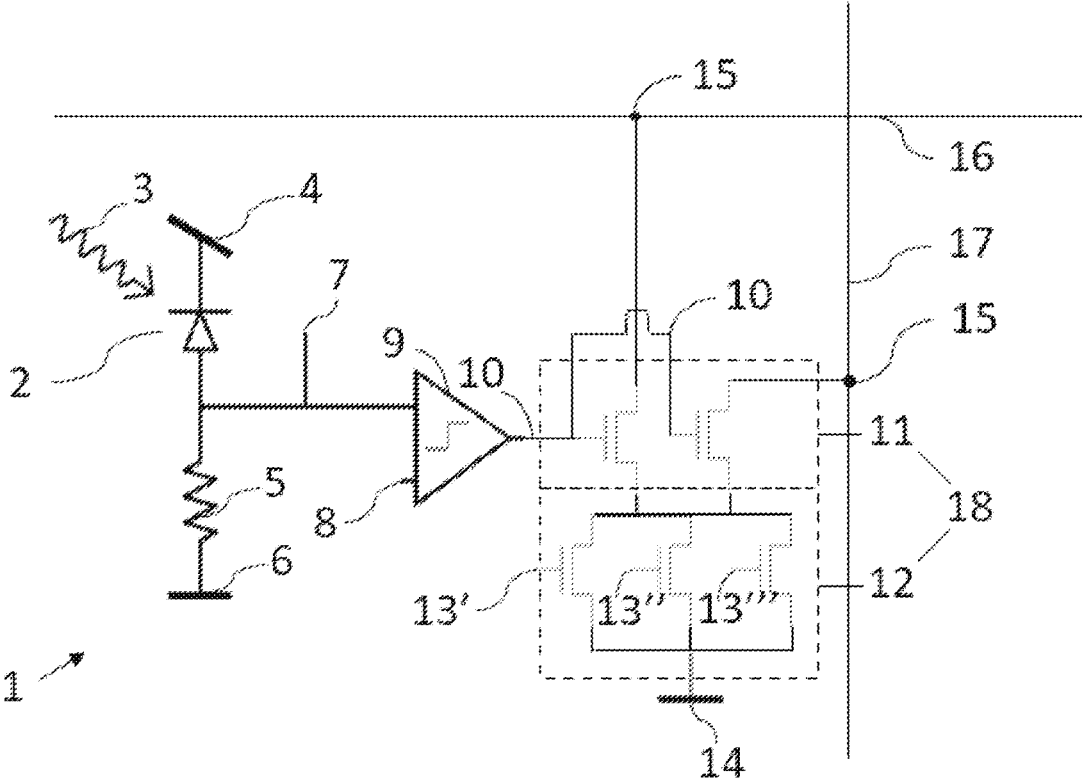
FIG. 3 shows a circuit implementation of a pixel sensor according to an embodiment of the invention.

FIG. 3 shows a possible implementation on circuit level of a pixel sensor (1). The sensor (1) contains a photo detector (2), for example a photon detector or a photon avalanche diode. The photo detector (2) is able to detect single photons (3) that are incident thereon. Such implementation can also be executed in a stacked way, by the breakdown between the detection layer (detector) and the processing layer (evaluation circuit).

The photo detector (2) is fed by a power source (4), and is connected to a resistor (5) in a voltage-splitting configuration. The photo detector (2) is arranged in a reverse biased configuration. The resistor (5) is connected with a first reference potential level (6), preferably an earthing level, or a zero V.

In the presence of photons (3) which fall on the photo-detector (2), a reverse current is generated. This results in a voltage drop (7) on the resistor (5). The voltage loss (7) has a logical "1" when photons (3) are detected on the photo detector (2), and has a logical "0" when no photons (3) are detected on the photo detector (2).

The voltage loss (7) is compared to a prefixed voltage threshold level (8) via a comparator (9). If the voltage loss (7) is higher than the reference voltage (8), a local detection signal (10) is generated at the output of the comparator (9). For example a logical "1" is generated at the output of the comparator in case of detection, and a logical "0" at the output of the comparator in case of no detection.

Every sensor (1) comprises a local control circuit (18). The comparator (9) acts as a buffer between the photo detector (2) and the local control (18). The local control (18) comprises local release (11) and local release (12).

The control circuit or parts thereof can be physically located in another layer in the sensor system. For example, the sensors (1) of the sensor series can be installed on a first semiconductor layer, while the control circuits (18) of each of the sensors (1) in the series can be installed on a second semiconductor layer, such that a stacked sensor solution is formed, as known in practice.

The local detection signal (10) is delivered to the local activation means (11). The local activation means (11) consists of two NMOS transistors. Other transistor types or configurations can be considered. The local detection signal (10) is guided to the ports of said transistors. One transistor is connected with a row bus (16), while the other is connected with a column bus (17). If a local detection signal (10) is received at the ports of the transistors of the local activation means (11), the local activation means (11) are activated. In this case the transistors work as a switch, and a logical "1" received on the transistors results in switching on the switch, e.g. by short circuit.

The local activation means (11) are connected with the proximity activation means (12). In this case every transistor in the local activation means (11) is connected to the proximity activation means. The proximity activation means (12) consist of at least one transistor, in this example three transistors, with ports (13', 13", 13"). The ports (13', 13", 13") of the three transistors are connected to local detection signals from neighbouring sensors. The transistors are also connected to a second reference potential level (14), preferably equal to the first reference potential level (6), preferably an earthing or a zero V. If at least one local detection signal of a neighbouring sensor is received at one port, for example (13'), the proximity activation means are activated. In this case this means that if the port (13') has a logical "1", the transistor, which acts here as switch, is switched on, e.g. a short circuit.

If both the local and the proximity activation means are activated, i.e. the transistors in the local activation means act as short circuit and one transistor in the proximity activation means acts as short circuit, an overall detection signal (15) is emitted on the row bus (16) and on the column bus (17). The overall detection signals of different sensors on the row bus (16) are merged to form a row of detection signals. The global detection signals from different sensors on the column bus (17) are merged to form a column detection signal. The local control circuit (18) acts as an AND-port in this example. When for example the local activation means (11)

and the proximity activation means (12) are activated, the global detection signal (15) is generated.

It is assumed that the present invention is not restricted to the embodiments described above and that a number of modifications or changes can be added to the described examples without revaluing the added claims.

The invention claimed is:

1. A sensor system comprising:
   one or more light sources;
   an array wherein the detectors are spatially distributed across the array in a substantial matrix form,
   wherein the detectors are single-photon detectors (SPDs) configured to:
   detect single photons of light, and
   register the detection of the single photons with a detection signal;
   at least one evaluation circuit, wherein at least two SPDs detectors are connected to the at least one evaluation circuit, the evaluation circuit being configured to confirm the detection signal or output signals of the detectors based on spatiotemporal conditions, wherein the at least one evaluation circuit is configured to modify the spatiotemporal conditions based on ambient light and based on intensity and/or other properties of the detected light, and wherein the spatiotemporal conditions for confirmation of detection signals of the detectors comprise: observing a programmable minimum number of detection signals in detectors located in a virtual macropixel associated with the detector to be confirmed within a time segment associated to a time of the observation of the detection signal of the detector to be confirmed, the macropixel comprising a number of detectors in proximity of the detector to be confirmed;
   wherein the system is configured to, upon detection of the ambient light:
   above a first prefixed threshold value, set the programmable minimum number of detection signals at detectors located in the virtual macropixel at a value of at least N, and
   below the first prefixed threshold value at a value of at most M,
   wherein M<N, with M equal to at least 1, and N equal to at least 2;
   wherein the system is configured to, upon detection of a strength of the detected light:
   above a first prefixed threshold value, set the duration of the time segment at a value of at most T1, and
   below the first prefixed threshold value at a value of at least T2, wherein T2>T1, with T1 equal to at least 1 ns;
   whereby the detectors are included in a first layer, and the at least one evaluation circuit is provided in a second layer, the second layer being positioned under the first layer, wherein the first layer is a detection layer, and the second layer is a processing layer.

2. The sensor system of claim 1, wherein the system is configured to confirm a detection signal if at least two pre-programmed sets of mutually different spatiotemporal conditions are met in parallel.

3. The sensor system of claim 1, wherein the one or more light sources emit a light beam or bundle with a known bundle diameter and/or known cross-section, and wherein the spatiotemporal conditions further depend on the bundle diameter and/or cross-section.

4. The sensor system of claim 1, wherein the at least one evaluation circuit clusters observed detection signals per time segment, wherein the time segments are consecutive and have an equal duration and wherein the time segment associated to the time of the observation of the detection signal of the detector to be confirmed, is the time segment in which the detection signal of the detector to be confirmed is observed.

5. The sensor system of claim 1, wherein based on ambient light and based on a strength of the detected light, the virtual macropixel is modified, wherein in accordance with the ambient light being detected below a second prefixed threshold value, a first virtual macropixel is used around the detector to be confirmed, and in accordance with the ambient light being detected above the second prefixed threshold value, a second virtual macropixel is used around the detector to be confirmed, wherein the second virtual macropixel comprises fewer detectors than the first virtual macropixel.

6. The sensor system of claim 1, wherein the detectors are provided with a quenching circuit that normalizes the detection signal of the detectors.

7. The sensor system of claim 1, wherein the at least one evaluation circuit is configured to confirm the detection signals of the detectors based on multiple sets of spatiotemporal conditions, wherein the at least one evaluation circuit subjects the detection signals to each of the multiple sets of spatiotemporal conditions in parallel;

wherein each of the multiple sets of spatiotemporal conditions for confirmation of a detection signal of a detector to be confirmed comprises the following conditions:

observing a programmable minimum number of detection signals in detectors located in a virtual micropixel associated to the detector to be confirmed within a time segment associated to the time of the observation of the detection signal of the detector to be confirmed, the micropixel comprising a number of detectors in the proximity of the detector to be confirmed, wherein each of the multiple sets of spatiotemporal conditions mutually comprises a different minimum number of detection signals and/or a different duration of the time segment for confirmation.

8. The sensor system of claim 7, in which the multiple sets of spatiotemporal conditions comprise a first set wherein the duration of the time segment of the first set T1 amounts to at least 10 ns, and the minimum number of detection signals of the first set M1 is equal to 1;

wherein the multiple sets of spatiotemporal conditions comprise a second set wherein the duration of the time segment of the second set T2 amounts to less than 10 ns and the minimum number of detection signals of the second set M2 amounts to at least 2;

wherein the multiple sets of spatiotemporal conditions comprise a third set wherein the duration of the time segment of the third set T3 amounts to at least 10 ns, and the minimum number of detection signals of the third set M3 is equal to 1.

9. The sensor system of claim 1, wherein the at least one evaluation circuit is configured for defining the macropixels, and wherein the detection signals of the detectors are binned together in one macropixel, and wherein the spatiotemporal conditions are imposed on the binned detection signals.

10. The sensor system of claim 9, wherein the at least one evaluation circuit is configured for redefining the macropixels, wherein the number of detectors per macropixels is adapted.

11. The sensor system of claim 1, wherein the macropixels can adopt at least two of the following configurations in the matrix form of the array: 2×1, 1×2, 2×2, 3×1, 1×3, 3×2, 2×3, 3×3, and/or star-shaped with 1 central detector with every directly adjacent detector.

12. The sensor system of claim 1, wherein the at least one evaluation circuit lets the time segments succeed each other periodically.

13. The sensor system of claim 1, wherein a further spatiotemporal condition is imposed on a confirmed detection signal of a detector in a first macropixel, wherein the further spatiotemporal condition comprises a confirmed detection signal associated to a detector in a macropixel adjacent to the first macropixel that is detected within a prefixed time window of the confirmed detection signal of the detector within the first macropixel;

wherein adjacent macropixels are defined as non-overlapping macropixels, the macropixels having at least one detector in common and/or each at least comprising a detector which in the matrix form of the array is adjacent to a detector of the other macropixel of the first and the adjacent macropixel.

14. The sensor system of claim 1, wherein a further spatiotemporal condition is imposed on a confirmed detection signal of a detector in a first macropixel, wherein the further spatiotemporal condition comprises that a confirmed detection signal associated to at least one other detector.

15. The sensor system of claim 1, wherein a first of the multiple sets of spatiotemporal conditions applies macropixels with a first number of detectors, and a second of the multiple sets of spatiotemporal conditions applies macropixels with a second number of detectors, the first and the second number of detectors being different from each other.

16. The sensor system of claim 1, wherein the detectors in a macropixel with K×L detectors are positioned in a square or rectangular configuration, wherein the detectors are clustered in the macropixel by the at least one evaluation circuit in R complementary sub-macropixels from $P_i \times Q_i$ detectors, with i=1 to R, with $P_i$ less than or equal to K/2, and $Q_i$ less than or equal to L/2;

wherein the detection signals of the detectors are aggregated into sub-macropixel detection signals by the at least one evaluation circuit per sub-macropixel, and the at least one evaluation circuit is configured for imposing the spatiotemporal conditions on the sub-macropixels and the sub-macropixel detection signals of the macropixel instead of on the detectors and the detection signals of the macropixel.

17. The sensor system of claim 1, wherein the sensor system relates to a stacked sensor system.

* * * * *